United States Patent
Khadiya et al.

(10) Patent No.: US 8,646,564 B2
(45) Date of Patent: Feb. 11, 2014

(54) TURBINE AUXILIARY POWER UNIT WITH A FUEL FIRED BURNER

(75) Inventors: Navin Khadiya, Columbus, IN (US); Wilbur H. Crawley, III, Nashville, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 946 days.

(21) Appl. No.: 12/691,758

(22) Filed: Jan. 22, 2010

(65) Prior Publication Data

US 2010/0181138 A1   Jul. 22, 2010

Related U.S. Application Data

(60) Provisional application No. 61/146,371, filed on Jan. 22, 2009.

(51) Int. Cl.
*B60K 5/00* (2006.01)
*F02C 6/04* (2006.01)
*F02C 3/06* (2006.01)
*F02C 7/32* (2006.01)
*F02C 9/00* (2006.01)

(52) U.S. Cl.
USPC ............. 180/301; 60/784; 60/39.12; 60/39.5; 60/805

(58) Field of Classification Search
USPC ............... 180/68.2, 301, 304; 60/39.12, 39.5, 60/295, 784, 805
See application file for complete search history.

(56) References Cited

U.S. PATENT DOCUMENTS

| | | | | | |
|---|---|---|---|---|---|
| 2,591,540 | A | * | 4/1952 | Grylls | 180/301 |
| 2,707,865 | A | * | 5/1955 | Huebner, Jr | 60/791 |
| 3,079,126 | A | * | 2/1963 | Pohl | 415/115 |
| 3,339,663 | A | * | 9/1967 | Anderson | 180/304 |
| 3,433,319 | A | * | 3/1969 | McLean | 180/250 |
| 3,446,306 | A | * | 5/1969 | Williams | 180/301 |
| 4,336,856 | A | * | 6/1982 | Gamell | 180/165 |
| 5,363,641 | A | * | 11/1994 | Dixon et al. | 60/778 |
| 2007/0266695 | A1 | * | 11/2007 | Lui et al. | 60/204 |
| 2008/0315589 | A1 | * | 12/2008 | Malmrup | 290/52 |

* cited by examiner

*Primary Examiner* — J. Allen Shriver, II
*Assistant Examiner* — Bridget Avery
(74) *Attorney, Agent, or Firm* — Carlson, Gaskey & Olds

(57) ABSTRACT

A vehicle auxiliary power unit includes a turbine to provide a turbine output, a fuel-fired burner that provides a heat source for the turbine, and a heat exchanger that receives the turbine output. The heat exchanger generates a heat exchanger output to produce a predetermined output condition such as heating/cooling a cabin compartment, heating an exhaust component to a desired temperature, and/or heating an engine block, for example.

24 Claims, 2 Drawing Sheets

TURBINE AUXILIARY POWER UNIT WITH A FUEL FIRED BURNER

RELATED APPLICATION

This application claims priority to U.S. Provisional Application No. 61/146,371, which was filed on Jan. 22, 2009.

TECHNICAL FIELD

The invention generally relates to a fuel-fired burner (e.g., a thermal regenerator) that is used as a heat source for a turbine that comprises an auxiliary power unit to provide power, heating, and/or cooling as needed.

BACKGROUND OF THE INVENTION

An auxiliary power unit (APU) is used to provide a power source for a vehicle cabin compartment such that heating, cooling, and/or electric power can be supplied to the cabin compartment without requiring the vehicle engine to be running. Thus, for example, the use of an APU eliminates long idling at truck stops, which in many situations could be as long as ten to twelve hours.

When used in such an application, the APU creates only the power required to run a heating, ventilation, and air conditioning (HVAC) unit for a driver who may be resting in the cabin compartment. Additionally, the APU provides assistance for the vehicle engine during cold-starts by heating up the engine block.

Typically, APUs are small diesel engines that are battery based. Further, most APUs are configured as burners such that only heat can be provided and not cooling. These diesel engines are expensive, heavy, fuel inefficient, noisy, and generate significant amounts of pollution.

SUMMARY OF THE INVENTION

A vehicle auxiliary power unit includes a turbine to provide a turbine output, a fuel-fired burner that provides a heat source for the turbine, and a heat exchanger that receives the turbine output.

In one example, the heat exchanger generates a heat exchanger output to produce a predetermined output condition such as heating or cooling a cabin compartment, and/or heating an engine block, for example.

In another example, the predetermined output condition comprises using output from the heat exchanger to regenerate a diesel particulate filter or to heat one or more catalysts in a vehicle exhaust system.

DETAILED DESCRIPTION OF THE PREFERRED EMBODIMENT

Figure 1:
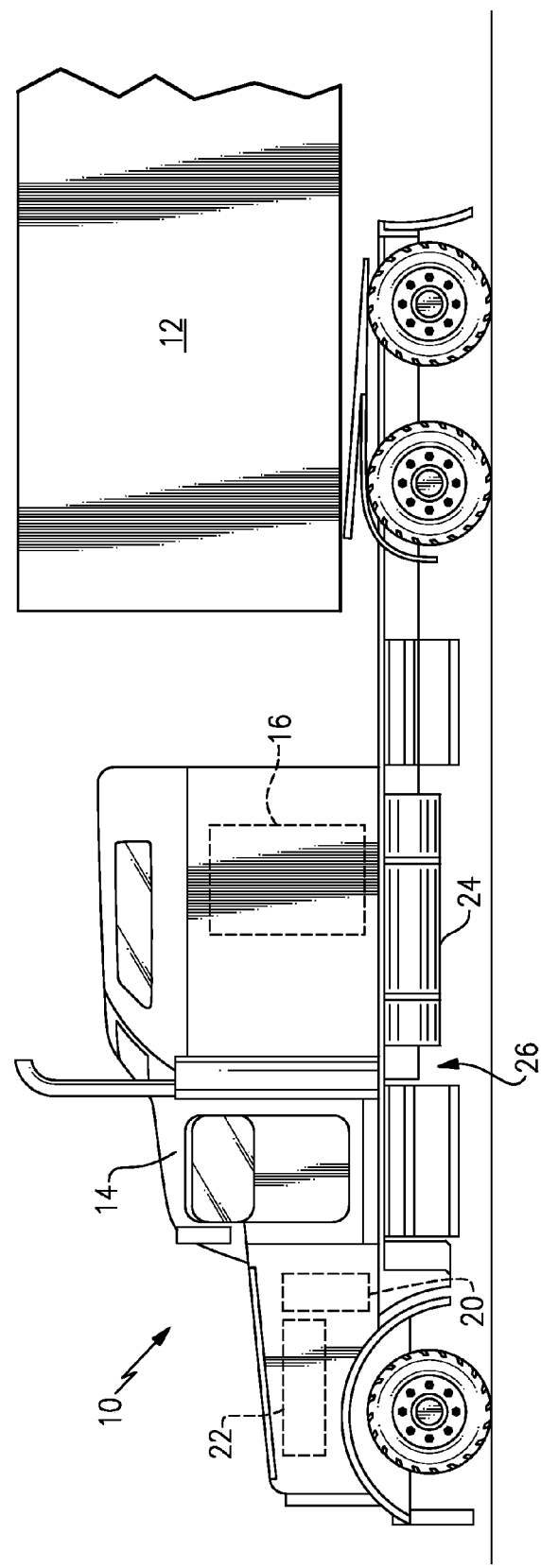
FIG. 1 shows a schematic view of a heavy-duty vehicle with a sleeper cab and which includes an auxiliary power unit.

A heavy-duty truck is shown generally at 10 in FIG. 1. The truck 10 is typically used to haul trailers 12 carrying cargo over long distances. The truck 10 includes a cabin or passenger compartment 14 from which a driver operates the truck 10. The cabin compartment 14 is supported on a chassis or frame structure and includes a sleeper portion 16 that allows the driver to rest during long trips. Typically, the driver will park the truck 10 at a truck stop or rest area, and will sleep for several hours in the sleeper portion 16.

In order to maintain a comfortable temperature level within the cabin compartment 14 an auxiliary power unit (APU) 20 is used to provide heating, cooling, and or electrical power to the cabin compartment 14 without requiring operation of a vehicle engine 22 or auxiliary engine. The APU 20 is supportable/mountable within the heavy-duty truck at a chassis mount interface.

In the example shown, the vehicle engine 22 is a diesel engine that receives diesel fuel from a vehicle fuel tank 24. The truck 10 also includes a main exhaust system shown generally at 26. The exhaust system 26 is comprised of various exhaust components as known, and is used to direct hot exhaust gases from the vehicle engine 22 through the various components to the external atmosphere. Examples of components that may be used in the main exhaust system include converters with catalysts, particulate filters, resonators, mufflers, etc.

Figure 2:
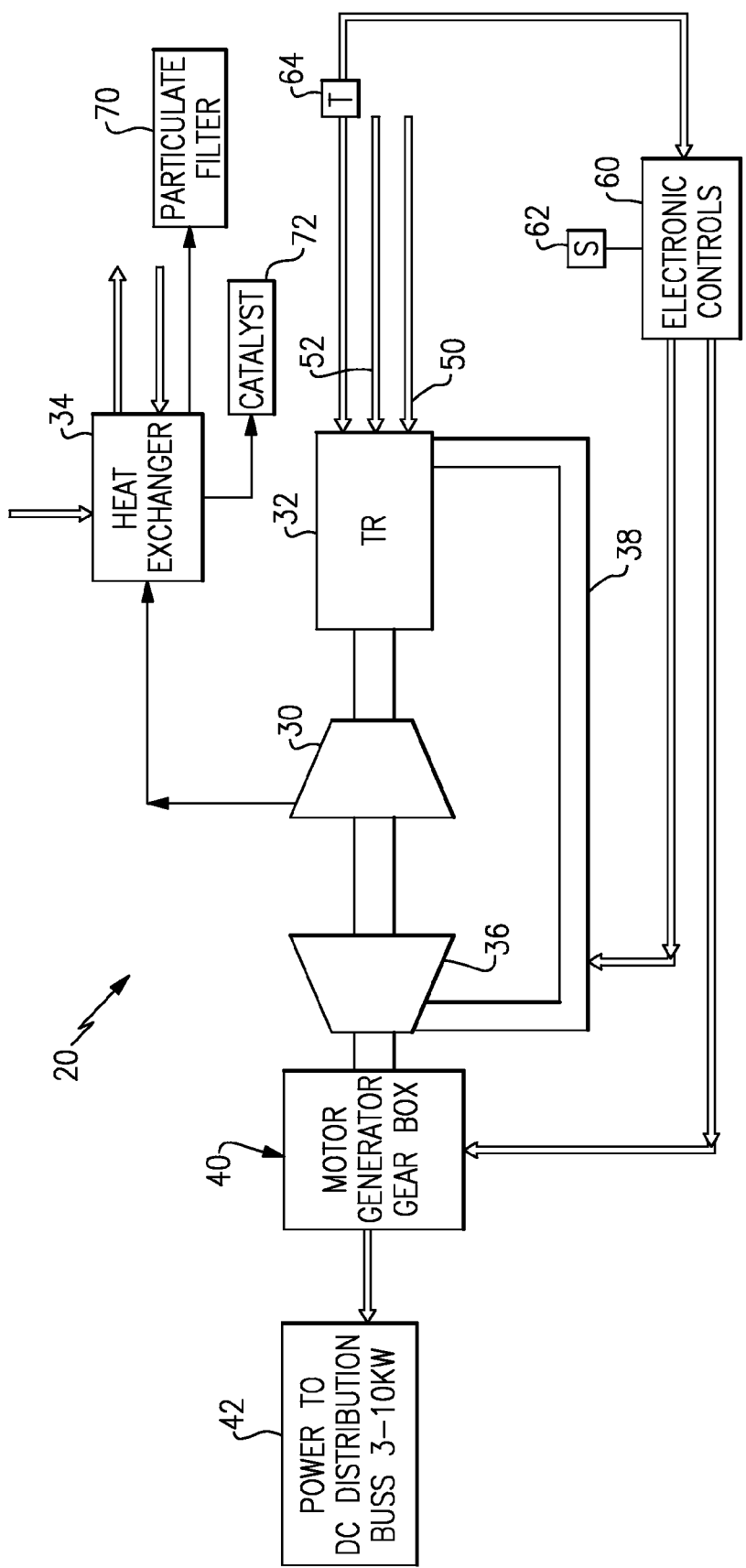
FIG. 2 is a schematic view of the auxiliary power unit and associated control system.

The APU 20 operates independently from any other vehicle engine to provide a significant fuel savings. The APU 20 is shown in greater detail in FIG. 2. The APU 20 includes a turbine 30 that provides a turbine output. A fuel-fired burner, such as a thermal regenerator (TR) 32 for example, is a heat source for the turbine 30. The turbine output includes a hot turbine exhaust gas that provides heat to heat a heat exchanger 34. The heat exchanger 34 can then provide a desired or predetermined output condition for the truck 10. For example, the desired condition could be heating/cooling the cabin compartment 14, or could include heating an engine block of the vehicle engine 22. As such, the heat exchanger 34 is used to control/vary temperature in the cabin compartment 14 as needed.

The turbine output also includes a rotational output that drives or rotates a compressor 36. The compressor 36 provides combustion air 38 as an input that is returned to the thermal regenerator 32. The compressor 36 also provides rotational output to drive a motor generator and gear box or alternator, shown generally at 40. The motor generator and gear box 40 provide electrical power to a DC buss 42 for the truck 10. This allows the driver to have electrical power available within the cabin compartment 14 to use as needed. Also, in one example, the motor generator and gear box 40 provide a mechanism for starting the APU 20.

The TR 32 has a fuel input 50 that receives diesel fuel from the vehicle fuel tank 24. Fuel from the fuel input 50 mixes with the combustion air 38 returned by the compressor 36. An igniter 52, such as an electrode for example, is used to ignite the fuel in the combustion air 38 to produce the exhaust gas that is fed into the turbine 30. As discussed above, hot turbine discharge exhaust gas is used to heat the heat exchanger 34 and rotational output from the turbine 30 is used to drive the compressor 36.

The APU 20 includes an electronic control unit 60 that issues control signals to control the various components in the APU 20. The control unit 60 is separate control unit; however, the control unit could be part of a vehicle main control unit or other sub-system control unit. The control unit 60 monitors the operation of, and generates control signals to control operation of, the turbine 30, the TR 32, the compressor 36, the heat exchanger 34, and the motor generator and gear box 40 as needed to achieve a desired APU output.

Various sensors 62 are also in communication with the control unit 60. In one example, a temperature sensor 64 is used to monitor the temperature of the thermal regenerator 32 to ensure that sufficient heat is being generated.

In another example, a desired output condition would be to use output from the heat exchanger 34 to regenerate a diesel particulate filter 70 or one or more catalysts 72 in the main exhaust system 26. Thus, the heat exchanger 34 provides several useful functions for the vehicle.

The APU 20 with a turbine 30 and fuel-fired burner that powers a heat exchanger 34 is a more efficient, less expensive, and less complex system than using a separate diesel engine to provide an APU.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle auxiliary power unit comprising:
   a turbine to provide a turbine output;
   a fuel-fired burner providing a heat source for said turbine;
   an electronic control unit that monitors and controls said fuel-fired burner; and
   a heat exchanger receiving said turbine output, said heat exchanger generating a heat exchanger output to produce a predetermined output condition, and wherein said vehicle auxiliary power unit operates independently of a vehicle engine.

2. The vehicle auxiliary power unit according to claim 1 wherein said turbine output includes turbine exhaust that provides heat to said heat exchanger.

3. The vehicle auxiliary power unit according to claim 1 wherein said turbine output includes a rotational output, and including a compressor that is driven by said rotational output to provide a combustion air source for said fuel-fired burner.

4. The vehicle auxiliary power unit according to claim 1 wherein said fuel-fired burner receives fuel from a vehicle fuel tank.

5. The vehicle auxiliary power unit according to claim 1 wherein said predetermined output condition comprises at least one of generating sufficient heat to regenerate a particulate filter and heating up at least one catalyst from a vehicle exhaust system.

6. The vehicle auxiliary power unit according to claim 1 including a chassis mount interface, the vehicle auxiliary power unit being supportable within a heavy-duty vehicle at said chassis mount interface.

7. The vehicle auxiliary power unit according to claim 1 including:
   a compressor, said turbine output providing a rotational output that drives said compressor to provide a combustion air source that is returned to said fuel-fired burner, and wherein said turbine output includes turbine exhaust that provides heat to said heat exchanger;
   a motor generator and gearbox driven by said compressor to provide an electrical output power source; and
   at least one of a particulate filter and a catalyst from a vehicle exhaust system that is regenerated based on output from said heat exchanger.

8. The vehicle auxiliary power unit according to claim 1 wherein the predetermined output condition comprises supplying heat to a vehicle exhaust system component.

9. The vehicle auxiliary power unit according to claim 2 wherein said predetermined output condition comprises at least one of heating a cabin compartment, cooling the cabin compartment, and heating an engine block.

10. The vehicle auxiliary power unit according to claim 3 including a motor generator and gearbox driven by said compressor to provide an electrical output power source.

11. A vehicle auxiliary power unit comprising:
    a turbine to provide a turbine output, wherein said turbine output includes a rotational output;
    a fuel-fired burner providing a heat source for said turbine;
    a compressor that is driven by said rotational output to provide a combustion air source for said fuel-fired burner;
    a heat exchanger receiving said turbine output, said heat exchanger generating a heat exchanger output to produce a predetermined output condition; and
    a motor generator and gearbox driven by said compressor to provide an electrical output power source, wherein said motor generator generates a signal to start the vehicle auxiliary power unit.

12. A method of controlling a vehicle auxiliary power unit comprising:
    operating a turbine to provide a turbine output;
    using a fuel-fired burner to provide a heat source for the turbine;
    monitoring and controlling the fuel-fired burner with an electronic control unit;
    producing a predetermined output condition from a heat exchanger that receives the turbine output; and
    generating a control signal from the electronic control unit to produce the predetermined output condition without requiring operation of a vehicle engine.

13. The method according to claim 12 including providing the turbine output as a turbine exhaust that provides heat to the heat exchanger, and wherein producing the predetermined output condition comprises at least one of increasing or decreasing a cabin compartment temperature, heating an engine block, and/or heating a vehicle exhaust component to a desired temperature.

14. The method according to claim 12 including providing the turbine output as a rotational output, and including driving a compressor with the rotational output to provide a combustion air source for the fuel-fired burner.

15. The method according to claim 12 including mounting the vehicle auxiliary power unit in a heavy-duty vehicle at a chassis mount interface.

16. The method according to claim 12 wherein the predetermined output condition comprises supplying heat to a vehicle exhaust system component that comprises at least one of a particulate filter or catalyst.

17. The method according to claim 14 including driving a motor generator and gearbox with the compressor to provide an electrical output power source.

18. A heavy-duty truck comprising:
    a chassis supporting a vehicle engine to drive the heavy-duty truck and supporting an exhaust system;
    a cabin compartment for housing an occupant, said cabin compartment being supported by said chassis; and
    a vehicle auxiliary power unit that does not require operation of said vehicle engine, wherein the vehicle auxiliary power unit includes a turbine to provide a turbine output, a fuel-fired burner providing a heat source for said turbine, and a heat exchanger receiving the turbine output, said heat exchanger generating a heat exchanger output to produce a predetermined output condition for at least one of said vehicle engine, said exhaust system, and said cabin compartment.

19. The heavy-duty truck according to claim 18 wherein said predetermined output condition comprises at least one of heating or cooling a cabin compartment, heating at least one catalyst in a vehicle exhaust system, generating sufficient heat to regenerate a particulate filter, and/or heating an engine block.

20. The heavy-duty truck according to claim 18 wherein said vehicle engine comprises a diesel engine powered by diesel fuel stored in a vehicle fuel tank, and wherein said fuel-fired burner directly receives diesel fuel from said vehicle fuel tank.

21. The heavy-duty truck according to claim 18 wherein said turbine output includes a rotational output, and including a compressor that is driven by said rotational output to provide a combustion air source for said fuel-fired burner.

22. The heavy-duty truck according to claim 18 wherein said vehicle auxiliary power unit includes a control unit that monitors and controls said fuel-fired burner.

23. A vehicle auxiliary power unit comprising:
a turbine to provide a turbine output;
a fuel-fired burner providing a heat source for said turbine;
an electronic control unit that monitors and controls said fuel-fired burner; and
a heat exchanger receiving said turbine output, said heat exchanger generating a heat exchanger output to produce a predetermined output condition, wherein said electronic control unit generates a control signal to produce the predetermined output condition without requiring operation of a vehicle engine.

24. A method of operating a vehicle auxiliary power unit independently of a vehicle engine comprising:
operating a turbine to provide a turbine output;
using a fuel-fired burner to provide a heat source for the turbine;
monitoring and controlling the fuel-fired burner with an electronic control unit; and
producing a predetermined output condition from a heat exchanger that receives the turbine output.

* * * * *